Dec. 1, 1970 L. W. HAAKER ET AL 3,543,593
CONTINUOUS TWIST WRIST JOINT
Filed June 4, 1969 3 Sheets-Sheet 2

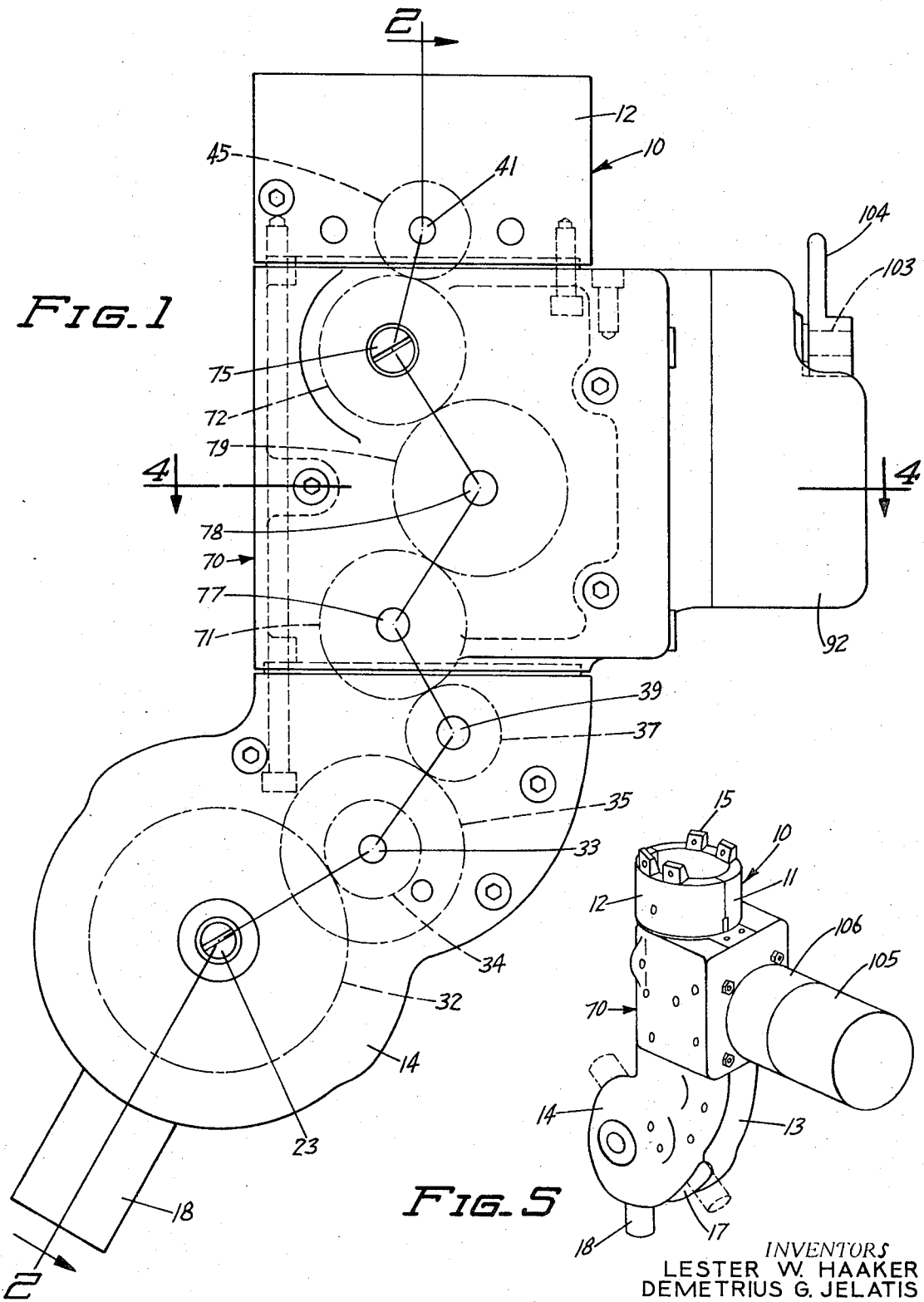

INVENTORS
LESTER W. HAAKER
DEMETRIUS G. JELATIS
BY Burd, Braddock & Bartz
ATTORNEYS

United States Patent Office 3,543,593
Patented Dec. 1, 1970

3,543,593
CONTINUOUS TWIST WRIST JOINT
Lester W. Haaker and Demetrius G. Jelatis, Red Wing, Minn., assignors to Central Research Laboratories, Inc., Red Wing, Minn., a corporation of Minnesota
Continuation-in-part of application Ser. No. 774,467, Nov. 8, 1968. This application June 4, 1969, Ser. No. 830,271
Int. Cl. F16h *27/06;* B25j *3/00*
U.S. Cl. 74—89.16      10 Claims

ABSTRACT OF THE DISCLOSURE

A wrist joint for mounting the tong means of a remote control master-slave manipulator characterized by continuous twist rotation. The wrist joint may be provided with a motorized drive or positional indexing system. A motorized slave arm twist joint may be controlled by switches or other control means on the master side. The slave tong assembly may be oriented independently of the master handle.

---

This application is a continuation-in-part of our co-pending application Ser. No. 774,467 filed Nov. 8, 1968 entitled Wrist Joint.

This invention relates to a new and improved wrist joint for the slave arm of a remote control master-slave manipulator of the type which is used by an operator to perform certain manipulative functions in some area remote from the operator as, for example, on the opposite side of a shielding wall. Such manipulators are well known and widely used. One such manipulator, to which the wrist joint of the present invention is especially adapted, is illustrated and described in U.S. Pat. No. 2,771,199 issued on Nov. 20, 1956 to Demetrius G. Jelatis, one of the instant co-inventors.

Manipulators of this general type comprise a horizontal tubular support usually mounted in a sleeve or tube so as to extend through a generally vertical shielding wall and to be rotatable therein. A master arm is suspended from one end of the horizontal support on one side of the wall and a slave arm is suspended from the opposite end on the other side of the wall. Both master and slave arms include a relatively stationary portion which is attached to the horizontal support and rotates with it on its horizontal axis and a relatively movable portion which is movable longitudinally relative to the stationary portion. The relatively stationary portions are pivotally attached to the horizontal tubular support and movable on those pivots, whereas the relatively movable parts are movable toward and away from those pivots.

A handle is supported from the lower end of the movable part of the master arm to be engaged by the hand of the operator and by appropriate motions transmitted along the master arm through the horizontal support and along the slave arm controls the movement of a tong means supported from the lower end of the movable part of the slave arm. The wrist joint of the present invention provides the means by which the tong means are connected to the slave arm and function in response to motions transmitted from the handle or otherwise controlled at the master arm side of the manipulator.

In the ordinary manipulator the wrist joint is limited in its twist motion to rotation of less than 360 degrees. This limits the usefulness of the manipulator for some functions, such as tightening screws and nuts, for example. Although it is now common practice for the slave arm to be indexed relative to the master arm in its X, Y and Z motions, the tong means is ordinarily oriented with the handle means.

The wrist joint of the present invention is vertically separable and has interposed between an upper tape drum system and a lower wrist differential gear system an auxiliary gear system which allows the tong means at the end of the slave arm to be rotated continuously or indexed to be oriented independently of the master handle.

The invention is illustrated in the accompanying drawings in which:

FIG. 1 is a side elevation of the wrist joint assembly, showing three vertically separable sections, with a ratchet mechanism in the intermediate section;

FIG. 5 is a perspective view of the wrist joint assembly with a motorized drive in the intermediate section.

Figures 2, 3:
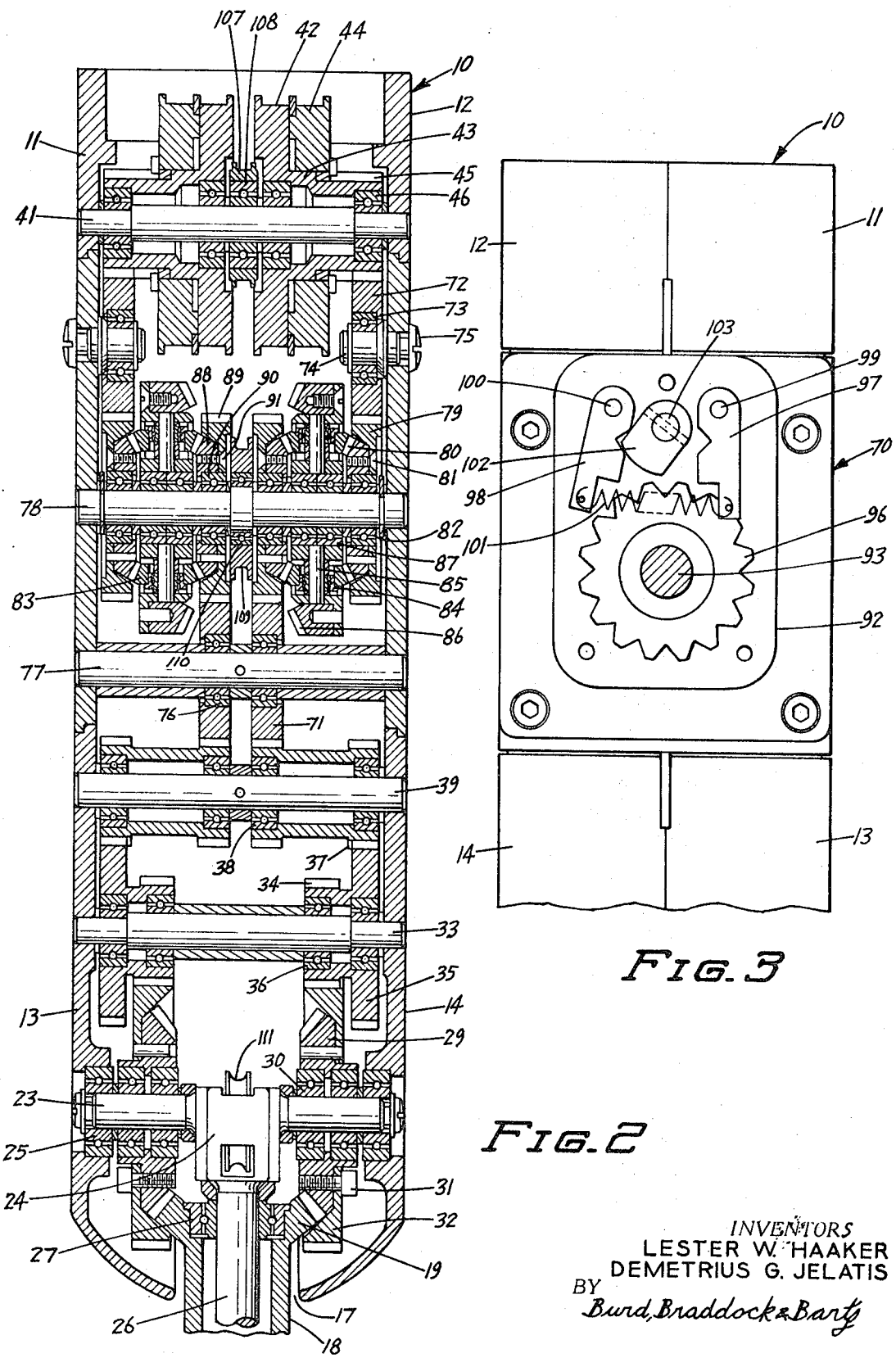
FIG. 2 is a section on the line 2—2 of FIG. 1 and in the direction of the arrows.
FIG. 3 is a fragmentary end elevation, partly in section on the line 3—3 of FIG. 1 and in the direction of the arrows, showing the ratchet mechanism.

Referring now to the drawings, the wrist joint assembly as shown in elevation in FIG. 1 represents a left hand elevation from the operator's point of view of the wrist joint in normal at-rest position. Another wrist joint in the same relative position is employed on the master arm. The master arm wrist joint may be generally of the type of copending application Ser. No. 774,467 or it may be any other type capable of transmitting handle motions. In virtually all instances the manipulators of which the wrist joints form a part are employed in spaced pairs so that the operator, by means of the use of two master control arms, is able to manipulate two slave arms in order to reproduce the action of a pair of hands in the remote area on the other side of the shielding wall. To the extent feasible, to facilitate comparison with the wrist joint of application Ser. No. 774,467, the same numbering system is employed.

The wrist joint assembly, indicated generally at 10, is enclosed in a housing whose upper portion is composed of a pair of complementary generally semi-cylindrical shell members 11 and 12 and whose lower portion is composed of a pair of complementary downwardly and forwardly extending hollow shell members 13 and 14. The upper and lower sections of the housing are connected through an intermediate middle auxiliary gear section 70 described in greater detail hereinafter. The top of the housing is open. Each of the upper housing members 11 and 12 is provided with a pair of upstanding arcuate ears 15 (FIG. 5) by means of which the wrist joint housing may be attached to the lower end of a manipulator arm boom tube and secured, as by means of screws. The remainder of the housing is closed except for a wide central slot 17 in the forward and downwardly extending surfaces of the lower housing portion to permit elevation movements of the handle and tong means to be transmitted by virtue of the tubular shank 18 of a bevel gear 19 which extends through that slot.

The trunnions 23 of of yoke 24 are journaled in a pair of ball bearings 25 carried in the opposite side walls of the lower portion of the assembly housing. A hollow tubular shaft 26 extends from yoke 24 and carries a pair of bearings 27 by means of which the tubular shank 18 of bevel gear 19 is journaled for rotation about an axis perpendicular to the axis of rotation of the yoke trunnions. Angular movement of the yoke 24 about the trunnions 23 is limited by means of the ends of the slot opening 17 in the wrist joint housing through which the shank of bevel gear 19 extends.

The tong means of the manipulator are carried by tubular shank 18. Bevel gear 19 meshes with a pair of bevel differential gears 29 which are journaled by means of two pairs of ball bearings 30 to rotate on trunnions 23 of yoke 24 and are secured, as by means of screws 31 to spur gears 32 for rotation together.

A stationary shaft 33, whose ends are supported in the opposite sides of the lower housing portion, carries a pair of two-part cluster gears 34–35 which are journaled by means of two pairs of ball bearings 36. A sleeve on shaft 33 maintains the gears spaced apart. Gear section 34 which is of smaller diameter meshes with spur gear 32 secured to the differential bevel gears 29. Cluster gear section 35 of larger diameter meshes with one end of a pair of dual idler spur gears 37 journaled by means of bearings 38 carried by shaft 39 extending between the opposite side walls of the lower housing section. The other end of each of gears 37 mesh with an idler spur gear 71 of the intermediate auxiliary gear section 70 as described in detail hereinafter.

The two-part elevation and twist tape drums are carried by a stationary horizontal shaft 41 whose ends are supported in opposite side walls of the upper portion of the wrist joint assembly housing. Each drum is composed of an inner flanged drum segment 42 having a hub 43 of reduced diameter on which is mounted an outer flanged drum segment 44. The inner drum segment 42 also has an outwardly extending gear toothed tubular hub extension 45 whose teeth mesh with the teeth of idler spur gear 72. The tape drum assembly is journaled for rotation about shaft 41 by means of pairs of bearings 46. Both drum segments are of the same diameter and are secured together to rotate together as a unit.

As is well understood in the art, the elevation and twist tapes, or similar linear motion transmission elements, extend in opposite directions in their respective grooves or channels of the composite tape drum so that, as the drum is rotated, one tape is being wound about the drum as the other is being unwound.

Each of the composite tape drums rotates independently of the other. In use, the paired tape couplings are continuous from the master end of the manipulator to the composite drum at the slave end in such manner that, with the tapes under pre-tension, motion can be efficiently transferred between master and slave end drums without backlash. The drums are completely independent. They rotate in opposite directions at the same speed under pure twist rotation. They rotate in the same direction at equal speeds under pure elevation rotation. Under combined elevation and twist movements, they can rotate at any combination of speeds and directions. One drum pair can be held stationary and the other rotated to produce a combined elevation and twist movement.

The upper and lower sections of the wrist joint assembly are vertically separable from the intermediate auxiliary gear section 70. The sections are desirably fit with half-lap butt joints to one another for rigidity and secured together by means of screws or similar fastening means. When the assembly is separated, gears 45 in the upper section are lifted out of engagement with idler spur gears 72 which are journaled by means of bearings 73 carried by a pair of stub shafts 74 extending inwardly from the upper ends of the opposite side walls of the intermediate housing section and secured by screws 75. Similarly gears 37 in the upper part of the lower section of the wrist joint assembly are lifted out of engagement with idler spur gears 71 which are journaled by means of bearings 76 on shaft 77 extending between the opposite side walls of the lower end of the intermediate housing section.

The intermediate wrist joint section 70 houses an auxiliary gearing system by means of which continuous rotation of the tong means may be achieved and through which the tongs may be oriented independently of the master arm handle. A fixed shaft 78 extends between the opposite side walls of the intermediate section 70. A pair of two-part composite gears, each having a spur gear section 79 which meshes with idler gear 72 and a bevel gear section 80 secured together as by means of screws 81, are journaled for rotation on shaft 78 by means of bearings 82. The bevel gear section 80 of composite gear 79–80 meshes with each of several bevel gears 83 which are journaled by means of bearings 84 about radial spoke shafts 85 carried within bevel gear 86. The outer ring bevel gears 86 are journaled by means of bearings 87 for rotation about shaft 78.

Bevel gears 83 mesh with the bevel gear sections 88 of composite two-part gears having also spur gear sections 89 which mesh with idler gears 71. Composite gears 88–89 are also journaled for rotation about shaft 78 by means of bearings 90. Composite gears 88–89 are mirror images of composite gears 79–80, the sections thereof being secured for rotation together, as by means of screws 91.

Figure 4:
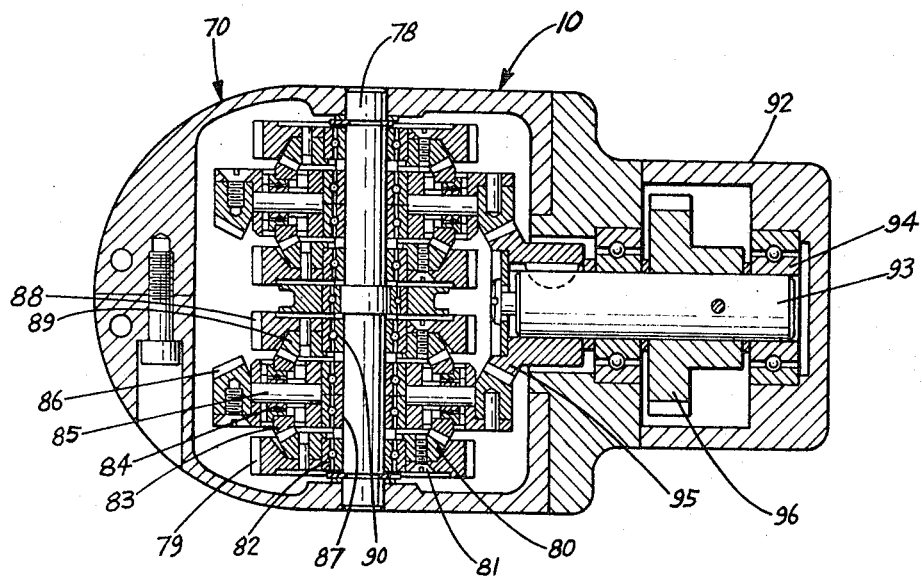
FIG. 4 is a horizontal section through the intermediate section of the wrist joint taken along the line 4—4 of FIG. 1.

The intermediate portion 70 of the wrist joint assembly has, as shown in FIGS. 1, 3 and 4, a projecting ratchet housing 92. A shaft 93 is journaled therein by means of a pair of bearings 94 for rotation about an axis perpendicular to that of shaft 78. A bevel gear 95 is fixed to the inner end of shaft 93 so as to mesh with the ring bevel gears 86. A ratchet wheel 96 is fixed to shaft 93 for rotation therewith.

A pair of pawls 97 and 98, are each pivotally mounted within the ratchet housing at 99 and 100, respectively. The pawls are spring loaded by means of a coil spring 101 extending between their free ends. A dog 102 on shaft 103 may be rotated to engage a notch in either of pawls 97 or 98 so as to hold that pawl out of engagement with ratchet wheel 96 and permit rotation of the ratchet wheel and shaft 93 only in one direction or the other. When dog 102 is in its intermediate neutral position, both pawls by virtue of spring 101 engage the ratchet wheel to lock shaft 93 against rotation. As seen in FIG. 1, shaft 103 extends through the ratchet housing and has a handle lever or arm 104 secured thereto for rocking the dog to bring the pawls into and out of engagement with the ratchet wheel.

As shown in FIG. 5, an electric motor 105 may be mounted on the intermediate wrist joint section 70 for driving shaft 93 and bevel gear 95, through appropriate reduction gearing in housing 106. Motor 105, actuated by switches from the operator's side of the barrier wall, may be used to index the tong means relative to the master handle by rotation by shaft 93 in either direction for short duration, or it may be used to continuously twist the tong means where the work being performed requires such motion.

A guide pulley 107 is journaled on the shaft 41 by means of bearing 108 between the pair of tape drums. Pulley 107 is adapted to be engaged by a tong cable (not shown) which extends thereover. A further guide pulley 109 is journaled on shaft 78 by means of bearing 110. The tong cable extends from guide pulley 109 between two guide pulleys 111 journaled in the yoke 24. The cable extends on through the hollow shaft 26 of the yoke to the tong means. A swivel fitting is provided in the run between pulleys 109 and 111 so as to prevent twisting of the cable.

The wrist joint, according to the present invention, may function in the normal manner with elevation and twist motions being transmitted from the handle up through the master, arm, through the horizontal support and down through the slave arm to the tape drums 42–44. The rotary motion of the tape drums is transmitted through the gear chain 45, 72, 79–80, 83 (ring bevel gear 86 being stationary), 88–89, 71, 37, 35–34, 32–29, and 19. If the wrist joint includes the ratchet mechanism, bevel gear 86 is maintained stationary by virtue of ratchet wheel 96 being locked against movement by pawls 97 and 98. By movement of lever 104, one of the pawls may be disengaged to permit rotation of the ratchet wheel in one direction only and corresponding rotation of bevel gear 86. Where the motorized drive is employed to rotate shaft 93 and bevel gears 95 and 86, then, by partial rotation of the shaft 93 in either direction, the tong means may be oriented independently of the master handle or, by continuous rotation in either direction, continuous twist rotation of the tong means is achieved.

The embodiments of the invention in which an exclusive property or privilege is claimed are defined as follows:

1. A wrist joint for a remote control master-slave manipulator comprising:
   (A) a housing including upper and lower portions and an intermediate auxiliary gear portion disposed therebetween;
   (B) a plurality of take-up means for linear motion transmission elements journaled to rotate within the upper portion of said housing, each of said take-up means being rotatable independently and each having a pair of circumferential channels for receiving linear motion transmission elements wrapped in opposite directions;
   (C) gear means secured to each of said take-up means;
   (D) means including a plurality of spur gears journaled in the lower portion of said housing;
   (E) a plurality of rotary auxiliary gears within said intermediate housing portion; said auxiliary gears providing means for introducing continuous rotation to the work performing means carried by the wrist joint;
   (F) means operatively connecting said auxiliary gears with the gears of said take-up means;
   (G) further means operatively connecting said auxiliary gears with said spur gears;
   (H) means operatively connecting said spur gears to work performing means carried by the lower portion of the wrist joint; and
   (I) means for securing the portions of said housing together whereby the housing portions and mechanisms contained therein are separable.

2. A wrist joint according to claim 1 further characterized in that said auxiliary gears include:
   (A) a pair of spaced apart idler gears journaled for rotation in said intermediate housing portion and operatively connecting with the gears of said take-up means;
   (B) a pair of first composite spur-bevel gears journaled for rotation in said intermediate housing portion, the spur gear sections thereof operatively connecting with said idler spur gears;
   (C) a plurality of radially oriented bevel gears operatively connecting with the bevel gear sections of said first composite gears;
   (D) a pair of second composite spur-bevel gears journaled for rotation on the same axis as said first composite gear, the bevel gear sections of said second composite gears also operatively connecting with said plurality of radially oriented bevel gears and the spur gear sections thereof operatively connecting with the spur gears journaled in the lower portion of the housing.

3. A wrist joint according to claim 2 further characterized in that:
   (A) a pair of ring bevel gears is journaled for rotation in said intermediate housing portion between said pairs of composite gears and on the same axis; and
   (B) said radially oriented bevel gears are journaled within said ring bevel gears for rotation on axes normal to the axis of said ring bevel gears.

4. A wrist joint according to claim 3 further characterized in that:
   (A) a shaft is journaled for rotation in said intermediate housing portion on an axis normal to the axis of said composite gears and ring bevel gears;
   (B) a bevel gear is mounted on said shaft in said intermediate housing portion, said bevel gear operatively connecting said pair of ring bevel gears and said shaft.

5. A wrist joint according to claim 4 further characterized in that a motorized drive is coupled to said shaft.

6. A wrist joint according to claim 4 further characterized in that:
   (A) a ratchet wheel is mounted on said shaft,
   (B) pawl means are pivotally mounted to engage said ratchet wheel,
   (C) means are provided to disengage said pawl means.

7. A wrist joint according to claim 6 further characterized in that:
   (A) a pair of pawls is pivotally mounted on opposite sides of said ratchet wheel,
   (B) spring means are provided to urge said pawls into engagement with said wheel,
   (C) dog means are pivotally mounted between said pawls to disengage the same; and
   (D) lever means are connected to said dog means for manual pivotal rotation thereof.

8. A wrist joint for a remote control master-slave manipulator comprising:
   (A) a housing including upper and lower portions and an intermediate auxiliary gear portion disposed therebetween;
   (B) a plurality of take-up means for linear motion transmission elements journaled to rotate within the upper portion of said housing, each of said take-up means being rotatable independently and each having a pair of circumferential channels for receiving linear motion transmission elements wrapped in opposite directions;
   (C) gear means secured to each of said take-up means;
   (D) means including a pair of spur gears journaled in the lower portion of said housing;
   (E) a pair of spaced apart idler gears journaled for rotation in said intermediate auxiliary gear housing portion and operatively connecting with the gears of said take-up means;
   (F) a pair of first composite spur-bevel gears journaled for rotation in said intermediate housing portion, the spur gear sections thereof operatively connecting with said idler spur gears;
   (G) a plurality of radially oriented bevel gears operatively connecting with the bevel gear sections of said first composite gears;
   (H) a pair of second composite spur-bevel gears journaled for rotation on the same axis as said first composite gear, the bevel gear sections of said second composite gears also operatively connecting with said plurality of radially oriented bevel gears and the spur gear sections thereof operatively connecting with the spur gears journaled in the lower portion of the housing;
   (I) a pair of ring bevel gears journaled for rotation in said intermediate housing portion between said pairs of composite gears and on the same axis, said radially oriented bevel gears being journaled within said ring bevel gears for rotation on axes normal to the axis of said ring bevel gears;
   (J) a shaft journaled for rotation in said intermediate housing portion on an axis normal to the axis of said composite gears and ring bevel gears;
   (K) a bevel gear mounted on said shaft in said intermediate housing portion, said bevel gear operatively connecting said pair of ring bevel gears and said shaft;
   (L) means operatively connecting said pair of spur gears journaled in the lower portion of the housing to work performing means carried by the lower portion of the wrist joint; and
   (M) means for securing the portions of said housing together whereby the housing portions and mechanisms contained therein are separable.

9. A wrist joint according to claim 8 further characterized in that a motorized drive is coupled to said shaft.

10. A wrist joint according to claim 8 further characterized in that:
(A) a ratchet wheel is mounted on said shaft,
(B) a pair of pawls is pivotally mounted on opposite sides of said ratchet wheel,
(C) spring means are provided to urge said pawls into engagement with said wheel,
(D) dog means are pivotally mounted between said pawls to disengage the same; and
(E) lever means are connected to said dog means for manual pivotal rotation thereof.

References Cited

UNITED STATES PATENTS 3,111,230 11/1963 Pesenti _____ 214—1
3,315,542 4/1967 Fortin et al. _____ 74—665

FRED C. MATTERN, Jr., Primary Examiner

W. S. RATLIFF, Jr., Assistant Examiner

U.S. Cl. X.R.

74—606, 665; 214—1